United States Patent
Wolf

(10) Patent No.: US 7,035,011 B2
(45) Date of Patent: Apr. 25, 2006

(54) SUPPORT SURFACE OF A DEVICE FOR OPTICALLY CAPTURING OBJECTS

(75) Inventor: Martin Wolf, Klaus (AT)

(73) Assignee: Wolf vision GmbH, Gotzis (AT)

( * ) Notice: Subject to any disclaimer, the term of this patent is extended or adjusted under 35 U.S.C. 154(b) by 4 days.

(21) Appl. No.: 10/506,901

(22) PCT Filed: Feb. 19, 2003

(86) PCT No.: PCT/EP03/01654

§ 371 (c)(1), (2), (4) Date: Sep. 7, 2004

(87) PCT Pub. No.: WO03/077025

PCT Pub. Date: Sep. 18, 2003

(65) Prior Publication Data

US 2005/0105181 A1    May 19, 2005

(30) Foreign Application Priority Data

Mar. 8, 2002    (DE) .............................. 102 10 322

(51) Int. Cl.
   *G02B 27/00*    (2006.01)
(52) U.S. Cl. .................. 359/599; 359/613; 359/363
(58) Field of Classification Search ................ 359/387, 359/800–818, 467–469, 475, 477
See application file for complete search history.

(56) References Cited

U.S. PATENT DOCUMENTS

| | | | |
|---|---|---|---|
| 2,581,000 A * | 1/1952 | Copeland | 359/466 |
| 3,499,715 A * | 3/1970 | Baumgartner et al. | 356/397 |
| 4,236,781 A * | 12/1980 | Arimura | 348/79 |
| 4,372,068 A * | 2/1983 | Knapp et al. | 40/367 |
| 4,916,550 A * | 4/1990 | Miyake et al. | 358/471 |
| 4,974,094 A * | 11/1990 | Morito | 348/370 |
| 5,642,206 A * | 6/1997 | Yamamori et al. | 358/471 |
| 5,774,263 A * | 6/1998 | Roy et al. | 359/469 |
| 5,947,575 A * | 9/1999 | Inaba | 353/9 |
| 5,947,577 A * | 9/1999 | Jikihara et al. | 353/97 |

* cited by examiner

*Primary Examiner*—Drew A. Dunn
*Assistant Examiner*—Mark Consilvio

(57) ABSTRACT

A device for optically capturing objects has a support surface (1) for an object, a light source (4) and a capturing means (5) for capturing the positioned object and for converting the image of the captured object into electrical signals. The light source (4) and the capturing means (5) are each arranged in a specific position relative to the support surface (1). The support surface (1) has a section (6) provided with a curvature determined by the two positions. Said section is arranged so that illuminating beams (2, 3) emitted by the light source can be reflected by the support surface (1) in the direction of the capturing means 5 substantially only in a diffuse manner.

6 Claims, 2 Drawing Sheets

SUPPORT SURFACE OF A DEVICE FOR OPTICALLY CAPTURING OBJECTS

CROSS-REFERENCES TO RELATED APPLICATIONS

This is an entry into national stage for PCT/EP03/01654, filed Feb. 19, 2003.

STATEMENT REGARDING FEDERALLY SPONSORED RESEARCH OR DEVELOPMENT

Not applicable.

BACKGROUND OF THE INVENTION

1. Field of the Invention

The invention relates to a device for optically capturing objects, having a support surface on whose first side an object can be placed.

2. Description of Related Art Including Information Disclosed Under 37 CFR 1.97 and 1.97

Such devices also have, in addition to a support surface, a light source for illuminating the first side of the support surface and a capturing means for optically capturing an object placed on the first side of the support surface. When the device is in the operating state, the capturing means and the light source are held by means of holders in a specific position relative to one another and relative to the support surface, the first side facing upwards and facing the light source and the capturing means.

Depending on the nature of the surface, the illuminating beams emitted by the light source are reflected in a diffuse manner in various directions by the support surface or are reflected in a directed manner in a specific direction with great intensity. In the case of directed reflection, the angle of reflection corresponds to the angle of incidence of the illuminating beams on the support surface. In certain positions of the light source and of the capturing means relative to the support surface, the support surface may have a region where illuminating beams are reflected in a directed manner in the direction of the capturing means. Illuminating beams reflected in a directed manner in the direction of the capturing means can reach intensities which considerably reduce the quality of the images of optically captured objects. These directed reflections are referred to as interference reflections or specular reflections.

By means of a suitable nature of the surface of the support surface—for example by means of a roughened surface provided with an appropriate coat of paint—it is known that it is possible to ensure that the illuminating beams are diffused in various directions. Thus, interference reflections caused directly by the surface of the support surface can be substantially prevented. If, however, an object having a surface reflecting in a highly directed manner, such as, for example, a printed product comprising high-gloss paper, a photograph or a foil, for example for an overhead projector, is placed flat on such a support surface and illuminated, the interference reflections may be so strong that optically capturing objects by the capturing means is no longer possible.

Interference reflections can be prevented in a manner known per se by choosing the distance of the light source from the capturing means or from the support surface to be appropriately large. However, a light source positioned so far away requires, as a rule, a plurality of light sources in order for a frequently required, uniform illumination of the support surface to be achieved. In addition, this remote positioning requires correspondingly large holding arms or booms, which leads to cumbersome and complicated devices.

European Patent Document EP 0 362 737 B1 discloses a device in which troublesome specular reflections are substantially avoided by means of illuminating beams which are projected via an objective and are aligned at small angles—in particular less than 2°—to the optical axis of the capturing means. This type of illumination requires—as described above—a large distance of the light source or capturing means from the support surface. This is achieved in this device by indirect projection of the illuminating beams or indirect focusing of the capturing beams by means of a mirror. Furthermore, an expensive projection objective coordinated with the light source is required in this device.

BRIEF SUMMARY OF THE INVENTION

It is therefore the object of the invention to eliminate deficiencies of the prior art. In particular, it is intended to propose a device for optically capturing objects placed on a first side of a support surface which substantially prevents interference reflections or specular reflections by simple means.

This object is achieved by a device for optically capturing objects, comprising a support surface on which whose first side an object can be placed, a light source which is provided for emitting illuminating beams in the direction of the support surface and which, in a first position, is arranged relative to the support surface, and a capturing means which is provided for capturing the object positioned object placed on the support surface—and optionally for converting the image of the captured object into electrical signals—and which, in a second position, is arranged relative to the support surface, wherein the first side of the support surface, on which the object can be placed, faces the illuminating beams and the capturing means, wherein the first side of the support surface has a flat region and—adjacent to this—a section which is provided with a curvature determined by the two positions and which is arranged in such a way that the illuminating beams are reflected by the section in the direction of the capturing means substantially only in a diffuse manner.

When the term objects is used in association with the invention, both graphic information recordings, such as text pages, document sections, printed products and images in the conventional sense, such as photographs, slides or drawings, as well as objects, such as components, designs or prototypes, are to be understood in the widest sense.

In contrast to the prior art, a device according to the invention has a support surface whose region which may cause interference reflections is provided a curvature. According to the invention, the provision of such a curvature makes it impossible for illuminating beams to be reflected in a directed manner and with high intensity in the direction of the capturing means.

A further development of the invention envisages providing a back-lit capturing region in a specific area on the support surface, which capturing region is suitable for optically capturing slides. A likewise back-lit preview region for further slides can optionally be provided adjacent to this capturing region. By means of additionally mounted positioning aids, optically capturing slides can be further simplified.

BRIEF DESCRIPTION OF THE SEVERAL VIEWS OF THE DRAWINGS

The invention is explained in more detail below, purely by way of example, with reference to the figures of the drawing. Identical parts in different embodiments which perform the same function are provided below with identical designations and reference numerals.

DETAILED DESCRIPTION OF THE INVENTION

Figure 1:
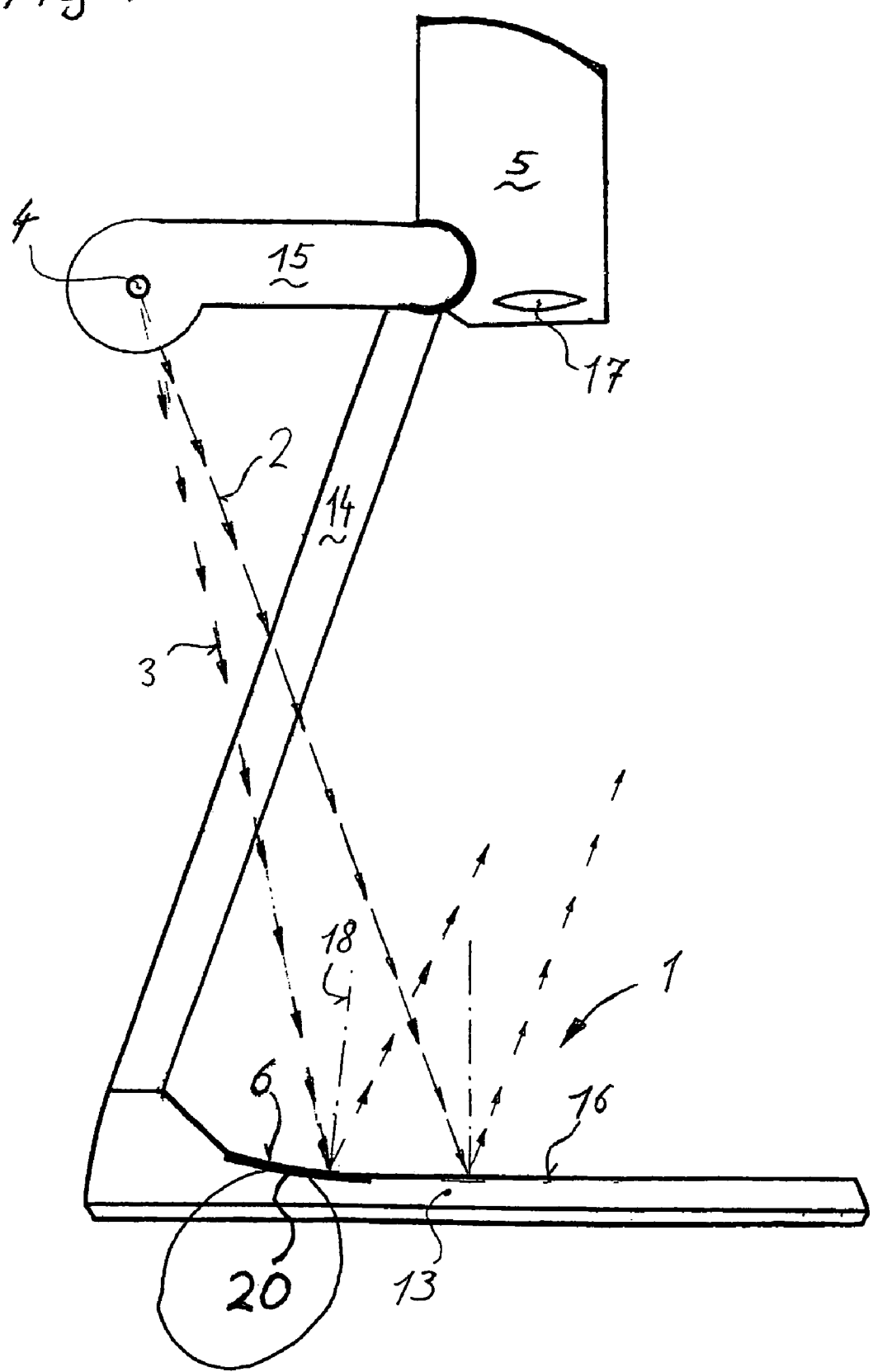
FIG. 1 shows a device, according to the invention, for capturing objects, in perpendicular side view.

FIG. 1 shows a device, according to the invention, for capturing objects in the position for use, in the perpendicular side view. The device has a base housing 13 with which a support surface 1 is coordinated, a holding arm 14, a boom 15, a light source 4 and a capturing means 5. Here, the support surface 1 substantially forms the top of the base housing 13 and faces the capturing means 5.

The support surface 1 has a section 6 provided with a curvature and a flat region 16 adjacent to this. In this embodiment—as clearly evident from FIG. 2—the curved section 6 is arranged perpendicular to the plane of the drawing from FIG. 1, corresponds—in said perpendicular side view in cross-section—to a segment of a conic section 20, has a moderate curvature and has a smooth transition with the flat region 16.

Here, the capturing means 5 is fastened to the holding arm 14 in a manner such that it is tiltable about a horizontal axis. Said capturing means 5 is held by means of the holding arm 14 in a specific position relative to the support surface 1. Here, the capturing means 5 is, for example, provided with a digital camera, of which only the objective lens 17 is shown schematically. In the case of optically capturing objects, rays are collected in a manner known per se via the objective lens 17, and an image is produced and, for example, converted into electrical signals by a CCD array in the digital camera. The optical axis of the capturing means 5 positioned above the centre of the support surface 1 is oriented approximately perpendicular to the flat region 16 so that the optical distortions of the image of the captured objects are small.

The light source 4 shown here as an elongated, thin fluorescent tube is held by means of the boom 15 in a specific position relative to the capturing means 5 and by means of the holding arm 14 also in a specific position relative to the support surface 1. The light source 4 emits illuminating beams in the direction of the support surface 1. Thus, by way of illustration, a first and a second beam 2 and 3, respectively, are directed towards the support surface 1, starting from the light source 4.

According to the invention, the flat region 16 of the support surface 1 is arranged in such a way that, even in the case of a directed reflection at the flat region 16, illuminating beams emitted by the light source 4 do not enter the objective lens 17. Thus, for example, the first beam 2 is reflected by the flat region 16 so that there is substantial distance between the first beam 2 reflected in the directed manner and the capturing means 5 and it can therefore no longer reach the objective lens 17. Even if an object having a strongly reflective surface, such as, for example, a printed product of high-gloss paper, is placed on the support surface 1, illuminating beams directed towards the flat region 16, for example the first beam 2, cannot cause any interference reflections or specular reflections.

If, in the case of a device having a completely flat support surface and the positions of the light source 4 and of the objective lens 17 shown in FIG. 1, a beam were emitted in the direction of the second beam 3 and reflected in a directed manner at the completely flat support surface, optically capturing objects could be at least greatly impaired by this interference reflection, if not even made completely impossible.

In the case of a device according to the invention, on the other hand, the support surface 1 has, however, the section 6 provided with a curvature, for example the section 6 having a curvature in only one direction—in the direction of the capturing means 5—with a mean radius of curvature of about 11 centimeters—in the case of a length of the holding arm 14 of about 50 centimeters and in the case of a distance between the light source 4 and the capturing means 5 of about 20 centimeters. The normal 18 to the surface—which normal determines the direction of the directed reflection—is slightly inclined at the respective reflection point of the curved section 6. As a result of this, illuminating beams reflected in a directed manner in the section 6 are not reflected in the direction of the capturing means 5. Thus, interference reflections or specular reflections can be counteracted effectively and in a simple manner during optically capturing objects.

If an object, for example a text foil for an overhead projector, is placed on the support surface 1 on the device according to the invention for optically capturing said objects, optical distortions occur with increasing distance from the flat region 16, owing to the curvature in the section 6. Here, however, these optical distortions are scarcely perceptible owing to the large mean radius of curvature of about 11 centimeters. If the capturing means 5 is tilted and is aligned with the section 6, the curvature even counteracts the optical distortions caused by the tilted position of the capturing means 5.

The formation of the curvature, here, for example, the value of the radius of curvature, is determined—in a manner which can be implemented by a person skilled in the art—by the position of the light source 4 and of the capturing means 5 relative to the support surface 1—and hence also relative to one another. If it is intended according to the invention to prevent interference reflections or specular reflections in a device for capturing objects, in which the light source 4 can be in a predetermined range of positions in space, in general a suitable curvature therefor can also be determined. In practice, in the generation of the shape of the curvature of the section and in its dimensioning and arrangement, the potential positioning space of the light source or of the capturing means relative to the support surface and the formation of the light source or of the capturing means have to be taken into account.

Figure 2:
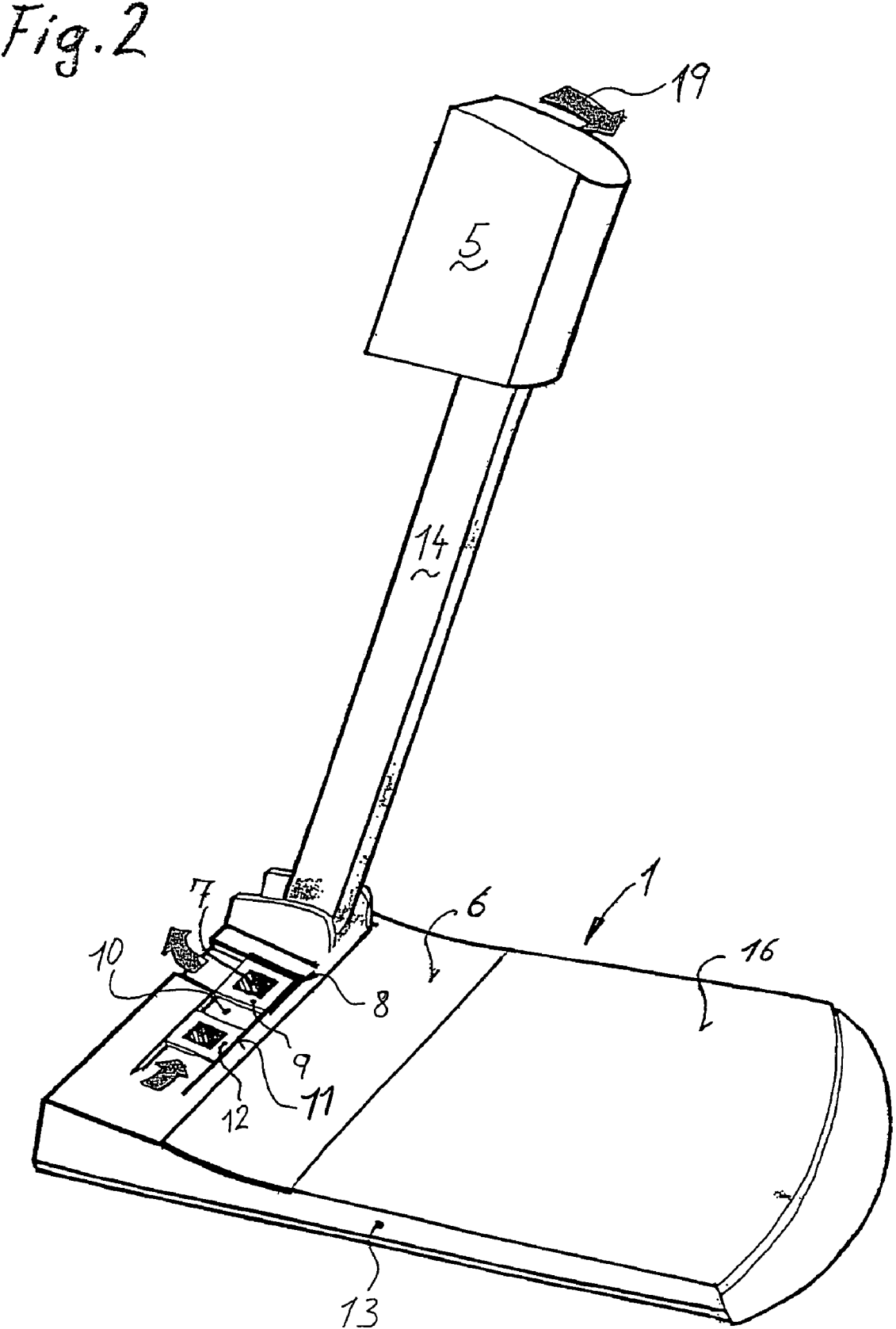
FIG. 2 shows a further embodiment of a device according to the invention having a back-lit slide capturing region, as an oblique view.

FIG. 2 shows a further embodiment of a device according to the invention, whose support surface 1 has a slide capturing region 7 and a preview region 10 in addition to the curved section 6 and the flat region 16 of the device from FIG. 1. A first and a second slide 9 and 12, respectively, rest on these regions. The light source 4 and the boom 15 coordinated with this are not shown in FIG. 2.

In contrast to the diagram from FIG. 1, here the capturing means 5 is not directed perpendicular to the flat region 16 of the support surface 1. The capturing means 5 is tilted and is oriented in the direction of the arrow 19 towards the slide capturing region 7. The slide capturing region 7 in turn is oriented perpendicular to the optical axis of the capturing means 5 in the tilted position, in order to minimize optical distortions. The rotatable fastening of the capturing means 5 to the holding arm 14 can be provided in an easy-to-operate manner by means of locking elements. This permits a repeatable, predetermined orientation of the capturing means 5 with the slide capturing region 7 and resetting to the starting position according to FIG. 1 in a simple manner.

In FIG. 2, a first slide 9 rests on the back-lit slide capturing region 7. The slide 9 can be positioned accurately over the specific, discrete slide capturing region 7 by means of a point-discrete positioning aid 8 in the form of a try square. In this way, the capturing means 5 can be aligned with the slide capturing region 7 in a predetermined manner and can be set for optically capturing the slide 9.

Here, a likewise back-lit preview region 10 is provided laterally adjacent to the slide capturing region 7 on the support surface 1. A second slide 12 rests on said preview region. The operator of the device can thus view the second slide 12 with his free eye. It is thus possible, for example, to check for correct orientation of the second slide 12 before capturing the second slide 12 by the capturing means 5.

By means of a line-discrete positioning aid 11 adjacent to the try square, it is also possible on the one hand to push the second slide 12 onto the slide capturing region 7 and, on the other hand, optionally also to view further slides placed on the preview region 10.

The invention claimed is:

1. Device for optically capturing objects, comprising:
   a support surface (1) on whose first side an object can be placed,
   a light source (4) which is provided for emitting illuminating beams (2, 3) in the direction of the support surface (1) and which, in a first position, is arranged relative to the support surface (1), and
   a capturing means (5) which is provided for capturing the object placed on the support surface (2)- and optionally for converting the image of the captured object into electrical signals—and which, in a second position, is arranged relative to the support surface (1),
   wherein the first side of the support surface (1), on which the object can be placed, faces the illuminating beams (2, 3) and the capturing means (5), characterized in that the first side of the support surface (1) has a flat region (16) and—adjacent to this—a section (6) which is provided with a curvature determined by the two positions and which is arranged in such a way that the illuminating beams (3) are reflected by the section (6) in the direction of the capturing means substantially only in a diffuse manner.

2. Device for optically capturing objects according to claim 1, characterized in that the section (6) has a curvature only in the direction of the capturing means (5).

3. Device for optically capturing objects according to claim 1, characterized in that the curvature corresponds—in perpendicular cross-section—to a segment of a conic section (20).

4. Device for optically capturing objects according to claim 1, characterized in that a back-lit, discrete slide capturing region (7) having a mechanical, point-discrete positioning aid (8) for the accurate positioning of at least one first slide (9) is coordinated with the support surface (1).

5. Device for optically capturing objects according to claim 4, characterized in that a back-lit preview region (10) is provided which is adjacent to the slide capturing region (7) and with which a mechanical, line-discrete positioning aid (11) for positioning at least one further slide (12) on a line is coordinated.

6. Device for optically capturing objects according to claim 4, characterized in that the capturing means (5) is rotatable relative to the support surface (1), and the capturing means (5) can be repetitively oriented with the discrete slide capturing region (7) by means of a locking element.

\* \* \* \* \*